UNITED STATES PATENT OFFICE.

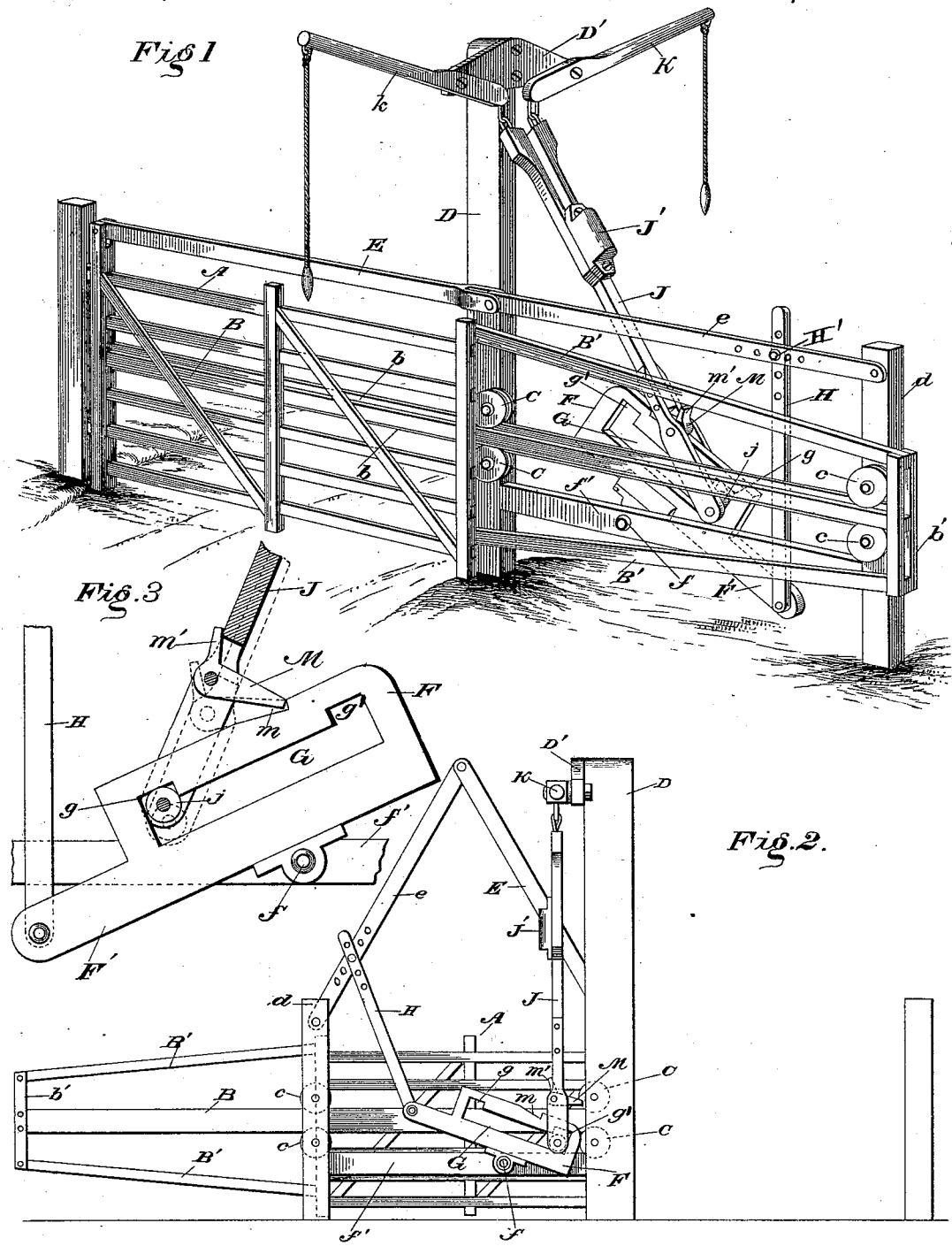

WILLIAM H. HOPKINS, OF ALBANY, AND GEORGE B. SIMONS, OF BLALOCK, OREGON.

SLIDING GATE.

SPECIFICATION forming part of Letters Patent No. 512,296, dated January 9, 1894.

Application filed May 15, 1893. Serial No. 474,723. (No model.)

*To all whom it may concern:*

Be it known that we, WILLIAM H. HOPKINS, of Albany, county of Linn, and GEORGE B. SIMONS, of Blalock, county of Gilliam, State of Oregon, have invented certain new and useful Improvements in Sliding Gates; and we do hereby declare that the following is a full, clear, and exact description thereof, reference being had to the accompanying drawings, and to the letters of reference marked thereon, which form part of this specification.

This invention is an improvement in the operating devices of sliding gates by which means the gate can be opened and closed by a pull on a lever at either side of the gateway, and the invention consists in the novel construction and combination of parts hereinafter described in detail and illustrated in the drawings, in which—

Figure 1 is a front perspective view of the gate closed. Fig. 2 is a rear elevation thereof. Fig. 3 is a detail view of the rocking plate detached and its operating lever.

The gate A is of any desired construction, and to it is attached a central horizontally arranged bar B which is about twice as long as the gate, extending in rear thereof and provided on one side with flanges $b, b$, which pass between guiding and carrying pulleys C, $c$, attached to a center post D and rear post $d$, as shown, by which means the gate is suspended above the ground and can be moved longitudinally back and forth.

B' are upper and lower braces respectively connected to the rear top and bottom corners of the gate, and to a vertical cross piece $b'$ on the rear end of bar B.

E, and $e$, are two bars or rods pivoted together at their adjoining ends, and by their opposite ends respectively pivotally connected to the front upper corner of the gate and to the post $d$ as shown. When the gate is closed the toggle is extended, its members lying horizontal as shown in Fig. 1.

F designates a rocking plate pivoted at its lower edge on a suitable support (such as a bolt $f$ attached to a bar $f'$ secured to and between posts D, $d$) near post D and capable of oscillating in a plane parallel to the gate. This plate has a longitudinal slot G in it, which slot has shallow, upwardly extending extensions $g, g'$ at its opposite ends, or is L-shaped at each end as shown. The plate also has a rearwardly extending arm F' to which is pivoted the lower end of a bar H the upper end of which is pivotally connected in any suitable manner to the bar $e$, near the post $d$, so that when arm H is raised the bar $e$ will be raised also, and the toggle consequently partially closed, causing the gate to open as indicated in Fig. 2. And when arm F' is lowered, the toggle is extended thereby causing the gate to close as in Fig. 1. The arm F' is of course raised or lowered by the rocking of the plate F.

J designates a pitman which as shown is bifurcated at its lower end and embraces the upper edge of plate F, and to which is connected the shaft of a roller $j$ which is adapted to traverse slot G. The upper end of pitman J is loosely connected in any suitable manner to the inner ends of oscillating levers K—$k$, fulcrumed on bolts attached to the opposite extremities of a cross piece D' on the upper end of post D. As shown, the upper end of pitman J is bifurcated, and the opposite bifurcations respectively connected to the opposite levers K and $k$. The levers K and $k$, may be provided with pull cords or strips, as usual, on their outer ends. The pitman may be provided with a weight J' so that it will always keep roller $j$ at the lower end of the slot G, and the outer ends of levers K, $k$, elevated. When the parts are in normal position, plate F stands at an angle, and when the gate is closed, arm F' is lowermost, and roller $j$ rests in the end of slot G opposite extension $g$. Upon raising pitman J by a pull on the outer end of either lever K, $k$, the roller $j$ will enter extension $g$ of the slot and be caught therein, so that the plate F is oscillated and arm F' raised, thereby causing the toggle to close and the gate to open; when fully opened and the lever released, the pitman drops down, causing roller $j$ to descend to the end of slot G opposite extension $g'$ which is now the lowest part of the slot. When the pitman is again uplifted, roller $j$ engages extension $g'$, and the plate F is therefore rocked back to first position, causing the spreading of the toggle and the closing of the gate. Thus by successively raising the pitman twice, the gate is opened and closed. In order to prevent the roller $j$ failing to engage extension $g'$ when it is desired to open the gate, a pawl M is pivoted to pitman J, and when the parts are in position shown in Fig. 1, the pawl engages a notch $m$ in the upper edge of the rocking plate. Consequently when the pitman is drawn upward, its end bearing roller $j$ is kept from moving longitudinally in the slot until the roller has entered extension $g$, and the action of the parts in opening is therefore insured. The pawl is provided with a stop $m'$ so that it will rise out of engagement with the notch as the gate opens. In closing the gate as the pitman hangs about perpendicular, roller $j$ will be lifted directly into extension $g'$. The bar H may be adjustably connected to the bar $e$ in any suitable manner so as to vary the normal inclination of the rocking plate, or the leverage exerted on bar $e$ thereby. As shown both bars H and $e$, are provided with a series of bolt holes with any of which their connecting bolt H' may be engaged.

Having described our invention, what we claim as new, and desire to secure by Letters Patent thereon, is—

1. The combination with the longitudinally movable sliding gate, of a toggle lever one member of which is connected to the gate, and the other to a fixed point in rear thereof; a rocking plate pivoted in rear of the gate, and a bar pivotally connected to said plate and to one member of the toggle lever, and the mechanism for rocking said plate, substantially as described.

2. The combination with the longitudinally movable sliding gate, of a toggle lever one member of which is connected to the gate, and the other to a fixed point in rear thereof; a rocking plate pivoted in rear of the gate, and a bar pivotally connected to said plate and to one member of the toggle lever, and the pitman loosely engaging a slot in said rocking plate, and the oscillating levers connected to said pitman, substantially as described.

3. The combination with the rocking plate having a longitudinal slot with extensions at its ends; with a pitman loosely connected to said plate so as to play in the slot and the pawl pivoted to said pitman for causing it to engage one of the extensions, substantially as and for the purpose described.

4. The combination of the gate, the toggle lever connected thereto, the bar pivotally connected to one member of said toggle, and to a rocking plate, with the rocking plate having a longitudinal slot with extensions at its ends; a pitman loosely connected to said plate so as to play in the slot, and the pawl for causing said pitman to engage one of the extensions, substantially as and for the purpose described.

5. The combination with the gate having a central carrying bar, the toggle connected to the front end of the gate and to a rear post, the rocking plate having a slot formed with upward extensions at its ends, and a bar connected to an arm on said plate and to the rear member of the toggle near its pivot; with the pitman having a roller playing in said slot, the pawl pivoted to said pitman and adapted to engage a notch in the plate, and the levers for raising said pitman, substantially as and for the purpose specified.

In testimony that we claim the foregoing as our own we affix our signatures in presence of two witnesses.

WILLIAM H. HOPKINS.
GEORGE B. SIMONS.

Witnesses to signature of William H. Hopkins:
T. P. HACKELMAN,
PERCY R. KELLY.

Witnesses to signature of George B. Simons:
PHEBE J. PARRISH,
C. H. NELSON.